(12) United States Patent
Patel et al.

(10) Patent No.: US 11,079,968 B1
(45) Date of Patent: Aug. 3, 2021

(54) QUEUE MANAGEMENT IN MULTI-SITE STORAGE SYSTEMS

(71) Applicant: International Business Machines Corporation, Armonk, NY (US)

(72) Inventors: Kushal Patel, Pune (IN); Subhojit Roy, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/796,983

(22) Filed: Feb. 21, 2020

(51) Int. Cl.
*G06F 3/06* (2006.01)

(52) U.S. Cl.
CPC .......... *G06F 3/0659* (2013.01); *G06F 3/0604* (2013.01); *G06F 3/065* (2013.01); *G06F 3/067* (2013.01); *G06F 3/0653* (2013.01)

(58) Field of Classification Search
CPC ...... G06F 3/0659; G06F 3/065; G06F 3/0653; G06F 3/0604; G06F 3/067
See application file for complete search history.

(56) References Cited

U.S. PATENT DOCUMENTS

| | | | |
|---|---|---|---|
| 9,781,053 B1 * | 10/2017 | Allen | H04L 47/74 |
| 10,310,760 B1 | 6/2019 | Dreier et al. | |
| 2017/0083252 A1 * | 3/2017 | Singh | G06F 3/0659 |
| 2019/0042151 A1 | 2/2019 | Yang et al. | |
| 2019/0294373 A1 | 9/2019 | Lee et al. | |
| 2019/0303003 A1 | 10/2019 | Freyensee et al. | |
| 2020/0174819 A1 * | 6/2020 | Dong | G06F 9/45558 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

*Primary Examiner* — Michelle T Bechtold
(74) *Attorney, Agent, or Firm* — Daniel M. Yeates

(57) ABSTRACT

A computer-implemented method to identify redundant Input/Output (I/O) queues in a multi-site storage system. The method includes receiving, from a host, by a backup storage system, a request to process a first set of Input/Output (I/O) queues, wherein the backup storage system is a second subsystem in a multi-site storage system. The method includes, allocating memory on the backup storage system. The method includes, identifying a second set of I/O queues established at a primary storage system, a first subsystem in the multi-site storage system. The method includes, determining the first set of I/O queues and the second set of I/O queues are redundant. The method includes, responsive to determining queues are redundant: notifying via the host, that the first set of the redundancy, terminating a connection between the host and the backup storage system, and de-allocating the memory to process the first set of I/O queues.

17 Claims, 6 Drawing Sheets

QUEUE MANAGEMENT IN MULTI-SITE STORAGE SYSTEMS

BACKGROUND

The present disclosure relates to storage systems, and, more specifically, to improving queue management in multi-site storage systems.

Solid state memory systems (e.g., flash, solid-state disks (SSD), etc.) have many benefits over traditional hard disk drives (HDD). Solid state is faster and has no moving parts that can fail. However, many interface standards were developed to operate with the moving parts of a traditional HDD (e.g., Serial Advanced Technology Attachment (SATA), Serial Attached Small Computer System Interface (SAS), etc.). There are new protocols that are designed for faster data transfer between servers, storage devices, flash controllers, and other similar components. These new systems can provide a register interface and command set that enables high performance storing and retrieving of data in a storage medium.

SUMMARY

Disclosed is a computer-implemented method to identify redundant Input/Output (I/O) queues in a multi-site storage system. The method includes receiving, from a host, by a backup storage system, a request to process a first set of Input/Output (I/O) queues on the backup storage system, wherein the backup storage system is a second subsystem in a multi-site storage system. The method also includes, allocating memory on the backup storage system for processing the first set of I/O queues. The method further includes, identifying a second set of I/O queues established at a primary storage system, wherein the primary storage system is a first subsystem in the multi-site storage system the secondary storage system includes a backup copy of data stored on the primary storage system. The method includes, determining the first set of I/O queues are redundant and determining the second set of I/O queues are redundant. The method also includes, responsive to determining that the first set of I/O queues are redundant and the second set of queues are redundant: notifying via the host, that the first set of I/O queues are redundant, terminating a connection between the host and the backup storage system, and de-allocating the memory to process the first set of I/O queues. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
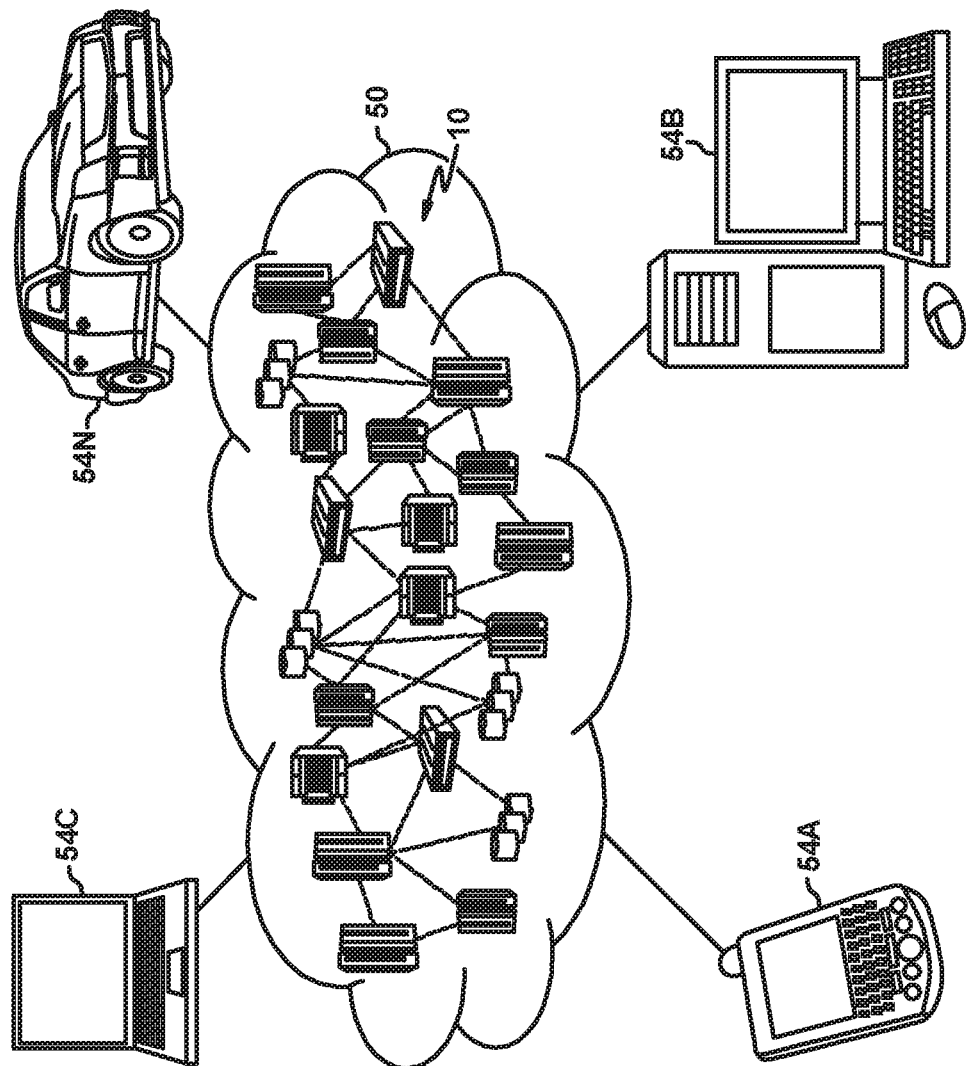
FIG. 1 depicts a cloud computing environment according to an embodiment of the present invention.

Many storage systems provide a mechanism for disaster recovery via multi-site solutions that can replicate and store multiple copies of data across multiple storage sites. In disaster recovery systems, a back-up copy of the customer data is kept at a site remote from the primary storage location. This copy is in sync with the primary copy which is used by a host for I/O operations. If a disaster strikes the primary storage location, the customer data can be recovered from the back-up copies located at the remote site.

In order to better utilize computing resources in multi-site storage systems, embodiments of the present disclosure may identify when the host establishes redundant I/O queues for multiple remote storage systems. Further, embodiments of the present disclosure may close/delete the redundant queues, thereby increasing the overall storage system efficiency.

The following acronyms may be used below:
API application program interface
ARM advanced RISC machine
CD- compact disc ROM
ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays RAM random access memory
RISC reduced instruction set computer
ROM read-only memory
SaaS software as a service
SLA service level agreement
SRAM static random-access memory
WAN wide-area network

CLOUD COMPUTING IN GENERAL

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
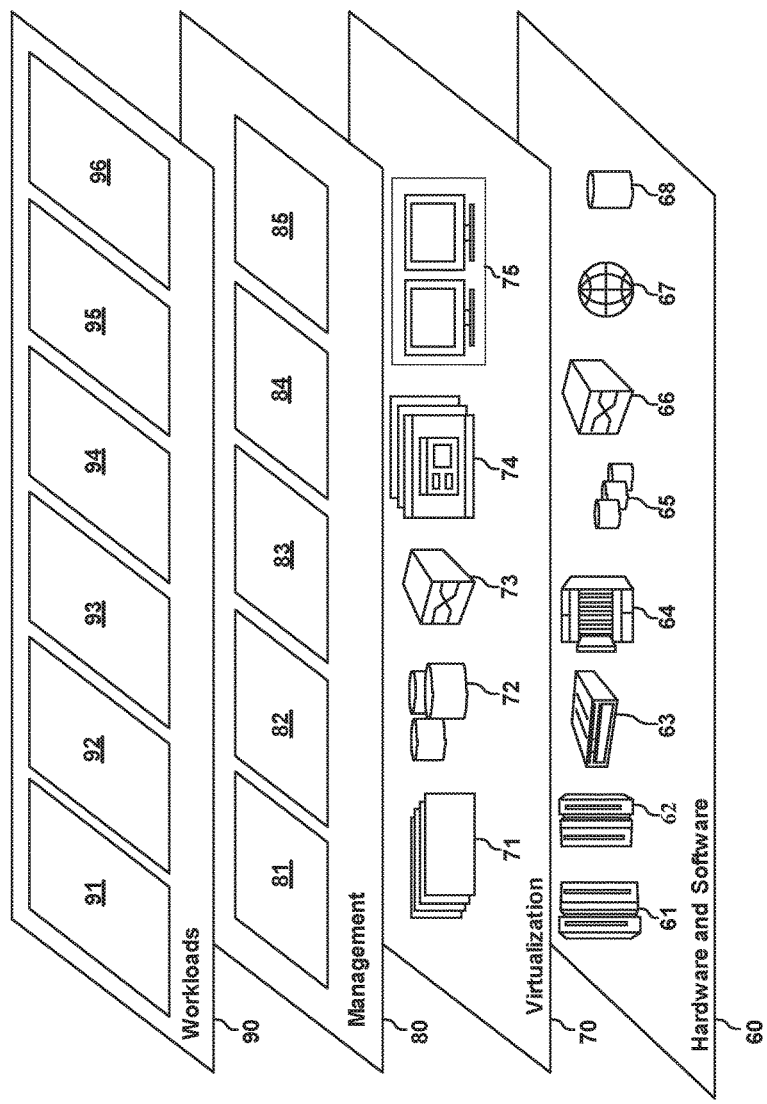
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

DATA PROCESSING SYSTEM IN GENERAL

Figure 3:
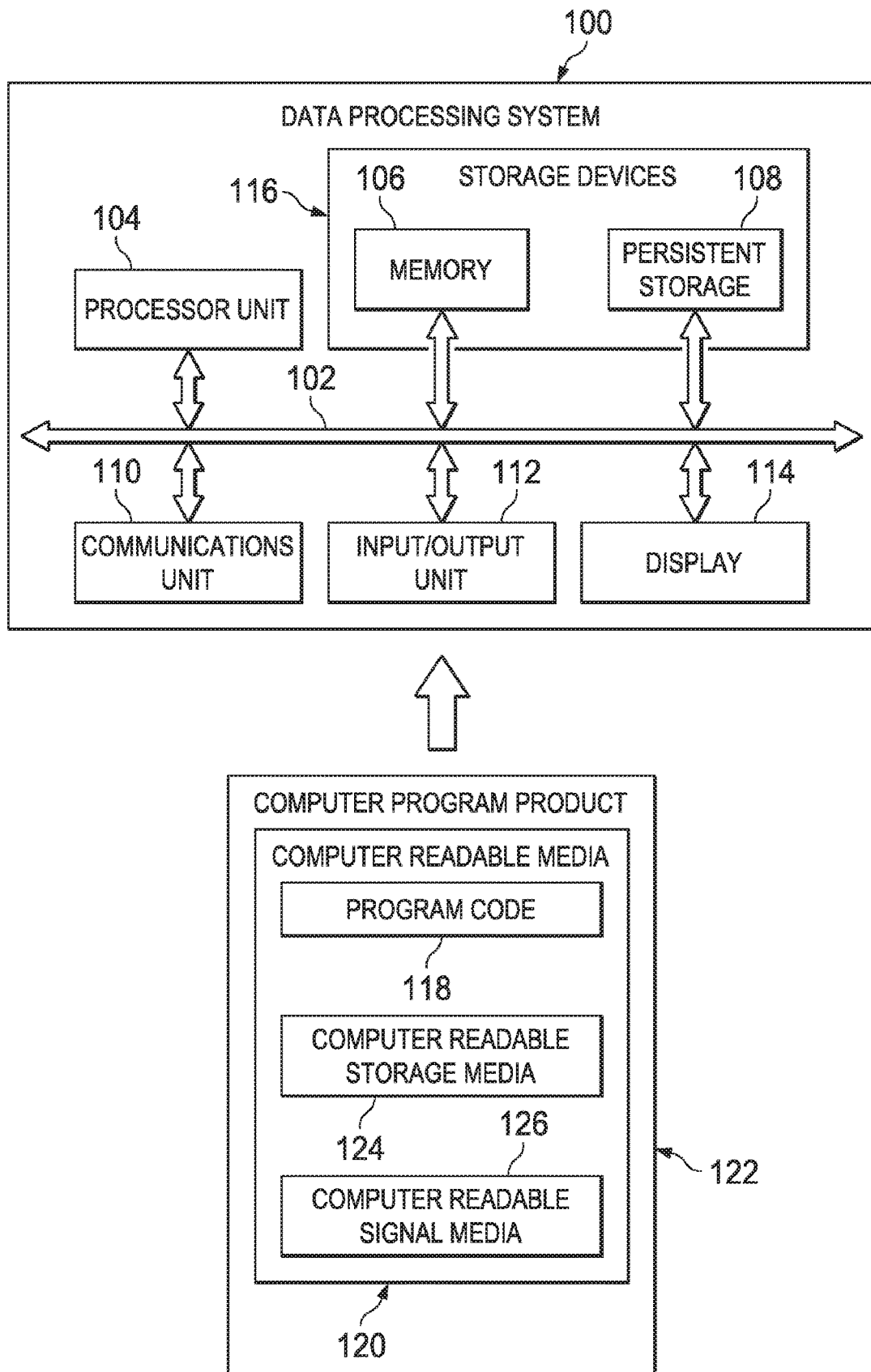
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

NVME QUEUE MANAGER IN MULTI-SITE STORAGE SYSTEMS

Non-volatile Memory Express (NVMe) is a storage protocol that is designed for fast data transfer between servers, storage devices, and Flash Controllers that typically uses a peripheral component interconnect express (PCIe) bus. The specification of NVMe provides a register interface and a command set that enables high performance Input/Output (I/O). This is an alternative to the traditional Small Computer System Interface (SCSI) standards (and other standards like SAS, SATA, etc.) for data transmission across the hosts and storage systems. One of the major advantages of NVMe-based Peripheral Components Interconnect Express (PCIe) Flash over SAS and SATA-based SSDs is reduced latency of access in the host software stack, leading to higher inputs outputs per second (IOPS) and lower computing resource utilization.

NVMe supports parallel I/O processing with multicore servers that results in faster I/O dispensation that leads to reduction in I/O latency. Since there are multiple cores that are processing I/O requests simultaneously, system performance increases due to optimal utilization of CPU resources. Additionally, NVMe is designed in a way that it expects to use a lesser number of CPU instructions per I/O. NVMe also supports 64,000 commands in a single message queue and a maximum of 65,535 I/O queues.

NVMe over Fabrics (NVMe-oF) is an extension to local PCIe NVMe that allows the benefits of NVMe like high-performance and low-latency across network fabrics. Servers and storage devices can be connected over an Ethernet network or a fiber channel, and both of these interconnects support NVMe commands over the fabric that extends the advantages of NVMe protocol to interconnected system components.

NVMe-oF supports multiple I/O queues for regular I/O operation from host to storage systems. A maximum of ~65000 queues are supported by NVMe with ~64000 entries in each queue. The host driver generally creates the queues once a connection is established. Once the host is connected to the target system, a special purpose queue is created upon association (e.g., an Admin Queue). As the name suggests, the Admin Queue is used to transfers control commands from an initiator to the target device. Once the Admin Queue is created, it is used by the host to create I/O queues based on system requirements. The host may establish multiple I/O queues to a single controller with the same NVMe qualified name (NQN) and have multiple namespaces (or Volumes) mapped to it. A volume can be a set of data (e.g., one or more extents, etc.) An NQN is a naming convention used to identify a connection between a host and a remote storage system. Once I/O queues are established, I/O commands are submitted to the I/O Submission queue (SQ) and I/O responses are collected from the completion queue (CQ). These I/O queues can be added or removed using control instructions sent via the Admin Queue for that session.

When a command is received on the target device for I/O queue creation, it performs initial system checks for max supported queues and other relevant fields, creates an I/O queue, and assigns this I/O queue to a CPU core on the storage controller. Once done, a response to the queue creation request is returned via the admin completion queue. Each I/O queue is assigned to a specific CPU core by the storage controller. This allows parallelism and boosts throughput of the system. Core assignment logic is implemented at the target storage controller and I/O queues to core mapping is performed based on a predefined policy at the storage controller.

Many storage systems provide a mechanism for disaster recovery. A disaster can be any natural or human caused event that permanently or temporarily renders a storage system inoperable. Disaster recovery systems may include multi-site solutions that can replicated data across the various sites. In disaster recovery systems, a back-up copy of the customer data may be kept at a site remote from the primary storage location. In some instances, the remote site may be at the same physical location, but have a separate power source. If a disaster strikes the primary storage location, the data can be recovered from the back-up copies located at one or more remote sites. Synchronous copying involves sending primary data to the secondary location and confirming the reception of such data before completing the current I/O operation. That is, a subsequent I/O operation at the primary site cannot start until the primary data has been successfully copied to the secondary storage system. Data transfer and synchronization between the two sites is managed by a controller (e.g., storage area network (SAN) Volume Controller). The controllers may be configured to act as a clustered system.

In some embodiments of disaster recovery systems, the host is connected to both the primary and the backup storage site. An application can send an instruction to store a set of data on the disaster recovery system. In response to the request/command, I/O queues are established at both the primary and secondary storage systems. Establishing the I/O queues includes allocating memory space to process the I/O queue (e.g., mapping host volumes to memory). However, the host will generally process the queues at the primary site. In the disaster recovery system, the primary site may have functionality to automatically sync/backup the data on the backup site. Thus, establishing I/O queues while the primary site is processing the same queues unnecessarily utilizes valuable memory at the secondary site, preventing other applications from using the previously allocated space.

Embodiments of the present disclosure can reduce the inefficiencies described above. Embodiments of the present disclosure monitor for redundant I/O queues established on multiple locations in a multi-site storage system. In response to identifying/determining there are redundant queues, the storage system may notify the host to deallocate the allocated memory. Thus, other applications/processes may utilize the de-allocated memory and other computing resources, thereby increasing the overall efficiency of the system.

Embodiments of the present disclosure increase system efficiency at the host. Once the host receives a notification of the redundant queues, it may also deallocate the memory reserved from the processing the I/O queues on the secondary system. The host may then track which queues are completed with the primary system, and store completion information. This may reduce a queue bottleneck in the host, allowing for more efficient processing of the I/O queues associated with the primary storage system and/or the host allocating additional queues for the primary system.

Embodiments of the present disclosure may be implemented within existing and deployed multi-site and/or disaster recovery storage systems. No significant hardware and/or software changes are needed to gain some benefits of the current disclosure.

In some embodiments, a storage manager identifies queues (or a request to establish queues) that have been received from a host. The storage manager may then determine similar queues are being processed on a different storage system. The two storage systems may be part of a disaster recovery system. The storage manager may notify the host of the redundant queues. In some embodiments, the notification is through the same channel the queues are established (e.g., NVMe Qualified Name (NQN) connections). In some embodiments, the notification is out-of-band (e.g., using a separate communication protocol). The host may terminate the connection in response the notification, and the de-allocated memory in the host and the storage system may be allocated to a different process.

In some embodiments, the host monitors and/or tracks the completion of queues from processes on the primary storage system. In the event of a disaster (e.g., loss of connection to the primary storage system), the host may re-establish the connection to the secondary storage system. The queues may not be established with the secondary storage system.

The aforementioned advantages are example advantages, and embodiments exist that can contain all, some, or none of the aforementioned advantages while remaining within the spirit and scope of the present disclosure.

Figure 4:
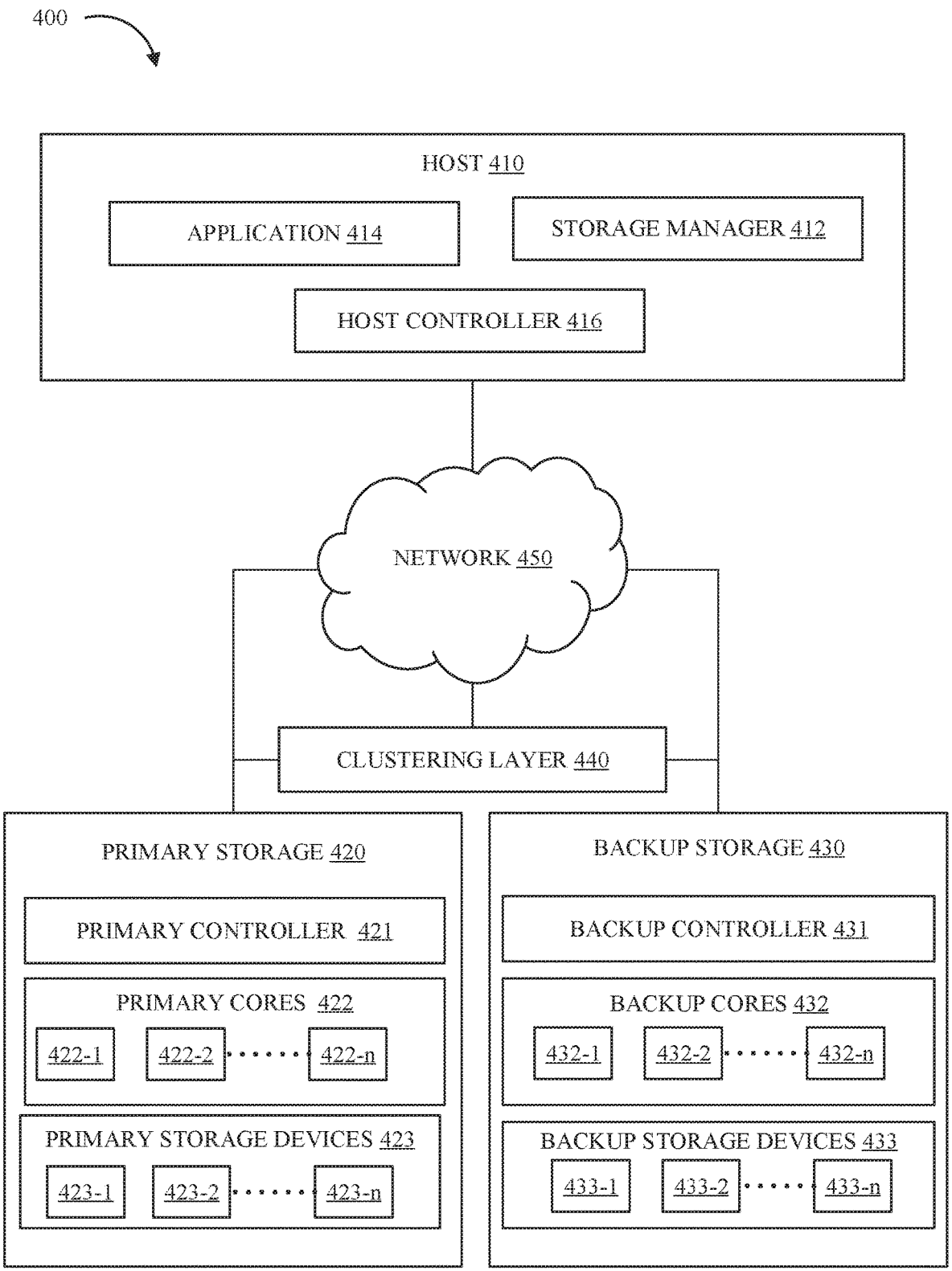
FIG. 4 illustrates a functional diagram of a computing environment suitable for operation of a queue manager, in accordance with some embodiments of the present disclosure.

Referring now to various embodiments of the disclosure in more detail, FIG. 4 is a representation of a computing environment 400 that is capable of running a storage manager, in accordance with one or more embodiments of the present disclosure. Many modifications to the depicted environment may be made by those skilled in the art without departing from the scope of the disclosure.

Computing environment 400 includes host 410, primary storage 420, backup storage 430, clustering layer 440, and network 450. Network 450 can be, for example, a telecommunications network, a local area network (LAN), a wide area network (WAN), such as the Internet, or a combination of the three, and can include wired, wireless, or fiber optic connections. Network 450 may include one or more wired and/or wireless networks that are capable of receiving and transmitting data, voice, and/or video signals, including multimedia signals that include voice, data, and video information. In general, network 450 may be any combination of connections and protocols that will support communications between host 410, primary storage 420, backup storage 430, clustering layer 440, and other computing devices (not shown) within computing environment 400. In some embodiments, host 410, primary storage 420, and backup storage 430, may include a computer system, such as the data processing system 100.

Host 410 can be a standalone computing device, a management server, a web server, a mobile computing device, or any other electronic device or computing system capable of receiving, sending, and processing data. In some embodiments, host 410 can represent a server computing system utilizing multiple computers as a server system, such as in a cloud computing environment shown in FIG. 1. In some embodiments, host 410 represents a computing system utilizing clustered computers and components (e.g., database server computers, application server computers, etc.) that act as a single pool of seamless resources when accessed within computing environment 400. In some embodiments host 410 includes, storage manager 412, application 414, host controller 416, and queue manager 418.

Storage manager 412 can be any combination of hardware and software configured to monitor for and remedy inessential I/O queues in a multi-site storage system. Storage manager 412 may be included in one or more of host 410, primary storage 420, backup storage 430, and clustering layer 440. However, it is shown in host 410 for illustration and by way of example.

In some embodiments, storage manager 412 can track the generation and completion of I/O queues being processed at remote storage sites (e.g., primary storage 420). In some embodiments, the tracking is in response to a notification and/or signal of redundant I/O queues. The tracked data may be stored within host 410 existing storage structure. The signal may be received from notifier engine 444 and/or out of band API 445. In some embodiments, the connection to backup storage 430 is terminated in response to receiving the signal. In some embodiments, storage manager 412 re-initiates a connection to backup storage 430 in response to storage 420 failing. The connection may include establishing I/O queues based on tracking data stored in host 410.

In some embodiments, storage manager 412 overrides the termination signal. A flag may be included in the initial request or sent in response to the signal.

Application 414 can be any combination of hardware and/or software configured to perform a function (e.g., messaging application, etc.) on host 410. In some embodiments, application 414 includes two or more separate applications. Application 414 may be configured to retrieve data from and/or store data in primary storage 420 and/or backup storage 430. In some embodiments, application 414 is configured to backup data on a disaster recovery system.

Host controller 416 can be any combination of hardware and/or software configured to facilitate the I/O queue transfer from an initiating device (e.g., host 410) and a storage system (e.g., primary storage 420). In various embodiments, host controller 416 may include one or more of storage manager 412, and/or queue manager 418. However, FIG. 4 shows them as separate components within host 410.

In some embodiments, host controller 416 generates and assigns I/O queues to various cores. The queues may be generated and assigned based on the requirements of the capabilities and need of host 410 and/or the capabilities and need of the target storage system(s). In some embodiments, host controller allocates memory for the processing of the queues on the initiator (e.g., host) and/or target devices.

Primary storage 420 can be a standalone computing device, a management server, a web server, a mobile computing device, or any other electronic device or computing system capable of receiving, sending, and processing data. In other embodiments, primary storage 420 can represent a server computing system utilizing multiple computers as a server system, such as in a cloud computing environment. In some embodiments, primary storage 420 represents a computing system utilizing clustered computers and components (e.g., database server computers, application server computers, etc.) that act as a single pool of seamless resources when accessed within computing environment 400. In some embodiments, primary storage 420 is an NVMe storage system. In some embodiments, primary storage 420 uses peripheral component interconnect express (PCIe) as a physical component to transfer data to and from the storage medium. PCLe is a high-speed connection and bus. PCLe can have a higher throughput with a lower pin count than some other standard connection types (e.g., PCI, accelerated graphics port (AGP), etc.). In some embodiments, primary storage 420 includes primary controller 421, primary cores 422, and primary storage devices 423.

Primary controller 421 can be any combination of hardware and/or software configured to facilitate the I/O queue transfer from an initiating device (e.g., host 410) and primary storage 420. In some embodiments, primary controller 421 is consistent with host controller 416. In various embodiments, Primary controller 421 can include one or more of storage manager 412, and/or queue manager 418.

Primary cores 422 can be any combination of hardware and/or software configured to process data. In some embodiments, primary cores 422 includes primary cores 422-1, 422-2, through 422-$n$. Primary cores 422 may refer to 422-1 through 422-$n$ collectively or representatively. In various embodiments, primary cores 422 may include any number of cores. In some embodiments, each core of primary core 422 may be assigned to process one or more I/O queues. Primary cores 422 may perform read/write operations for primary storage devices 423.

Primary storage devices 423 can be any combination of hardware and/or software configured for the long-term storage of data. In some embodiments, primary storage devices 423 includes primary storage devices 423-1, 423-2, through 423-$n$. Primary storage devices 423 may refer to 423-1 through 423-$n$ collectively or representatively. In various embodiments, primary storage devices 423 may include any number of devices (e.g., n can be any number). Each device of storage device 423 may be the same type of device, may be different types, or may be any combination of devices. The storage devices may include any type of storage medium (e.g., tape drives, hard disk drives (HDD), solid state drives (SSD), flash, etc.)

Backup storage 430 (secondary storage) can be a standalone computing device, a management server, a web server, a mobile computing device, or any other electronic device or computing system capable of receiving, sending, and processing data. In other embodiments, primary storage 420 can represent a server computing system utilizing multiple computers as a server system, such as in a cloud computing environment, as shown in FIG. 1. In some embodiments, primary storage 420 represents a computing system utilizing clustered computers and components (e.g., database server computers, application server computers, etc.) that act as a single pool of seamless resources when accessed within computing environment 400. In some embodiments, backup storage 430 is an NVMe storage system. In some embodiments, primary storage 420 uses peripheral component interconnect express (PCLe) as a physical component to transfer data to and from the storage medium. PCLe is a high-speed connection and bus. PCLe can have a higher throughput with a lower pin count than some other standard connection types (e.g., PCI, AGP, etc.). In some embodiments, backup storage 430 includes backup controller 431, backup cores 432, and backup storage devices 433. In some embodiments, backup storage 430 is consistent with primary storage 420.

Backup controller 431 can be any combination of hardware and/or software configured to facilitate the I/O queue transfer from an initiating device (e.g., host 410) and backup storage 430. In some embodiments, backup controller 431 is consistent with primary controller 421.

Backup cores 432 can be any combination of hardware and/or software configured to process data. In some embodiments, backup cores 432 includes secondary cores 432-1, 432-2, through 432-$n$. backup cores 432 may refer to 432-1 through 432-$n$ collectively or representatively. In various embodiments, backup cores 432 may include any number of cores. In some embodiments, backup cores 432 may be consistent with primary cores 422.

Backup storage devices 433 can be any combination of hardware and/or software configured for the long-term storage of data. In some embodiments, backup storage devices 433 includes backup storage devices 433-1, 433-2, through 433-$n$. Backup storage devices 433 may refer to 433-1 through 433-$n$ collectively or representatively. However, in various embodiments, backup storage devices 433 may include any number of devices. In some embodiments, backup storage devices may be consistent with primary storage devices 423.

Clustering layer 440 can be any combination of hardware and/or software configured to sync data between primary storage 420 and backup storage 430. In some embodiments, clustering layer 440 includes primary controller 421 and backup controller 431. In some embodiments, clustering layer monitors data transfers/requests/connections between host 410 and the associated storage systems. This may include identical/equivalent/redundant queues established by the host between multiple storage systems. Redundant doesn't necessarily mean exactly the same, such as the same I/O commands in the queue, rather the commands in the I/O queues stem from a common source. The common source may be a common application, a common command. Said differently, redundant queues may include queues, where the automatic backup processes of the disaster recovery system provide the same results (e.g., backup copy of the data after the I/O commands are complete on a different storage subsystem) as being processed via the host to primary storage and host to backup storage I/O commands.

In some embodiments, clustering layer 440 can transfer data and/or messages between host 410, primary storage 420, and backup storage 430. The messages may be sent via pre-established connections (e.g., NQN's), or out of band communications. Clustering layer 440 is discussed in further detail in relation to FIG. 5.

Figure 5:
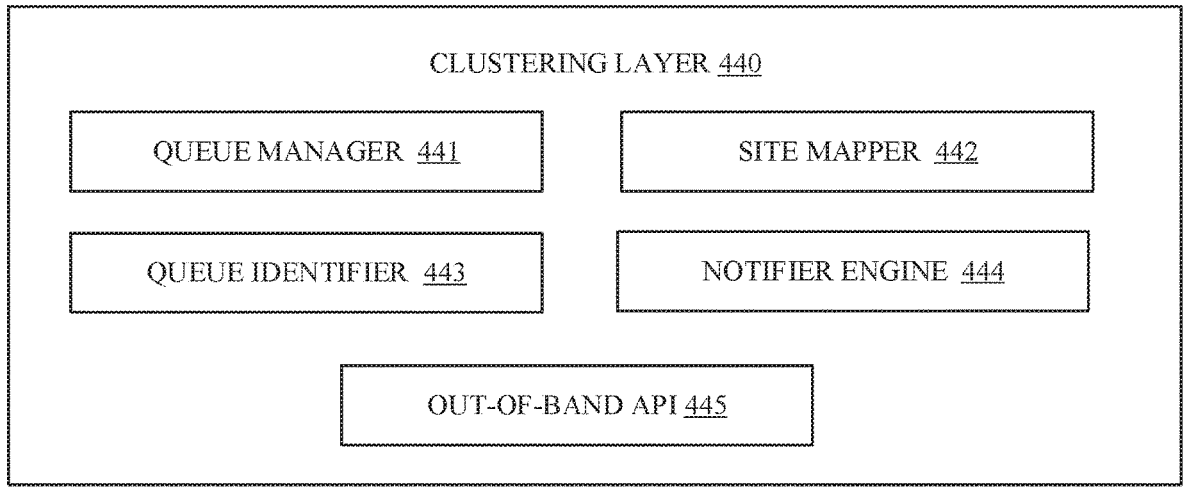
FIG. 5 illustrates a function diagram of a clustering layer, in accordance with some embodiments of the present disclosure.

FIG. 5 is an expanded view of clustering layer 440. In some embodiments, clustering layer 440 includes queue manager 441, site mapper 442, queue identifier 443, notifier engine 444, and out-of-band API 445.

Queue manager 441 can be any combination of hardware and or software configured to set up and maintain an admin queue for each host connected to the storage system. Each time an I/O queue is sent from a host to the target, it passes through the admin queue. The admin queue then assigns the queue to a core, based on instruction and logic in an NVMe storage controller (e.g., primary controller 421). After a core completes the processing of the command I/O queue, the result is placed in the admin queue and is subsequently forwarded to the host.

In some embodiments, queue manager 441 keeps a record of how many queues have been sent to and returned from each core. Therefore, at any time, queue manager 441 can determine the number of queues distributed to any particular core.

Site to queue mapper 442 can be any combination of hardware and/or software configured to map I/O queue creation requests to one or more storage devices in a multi-site storage system. In some embodiments, site to queue mapper 442 monitors and/or tracks which I/O queues are established at each storage site. The monitoring may include tracking which queues are processed. This may include relating to the source of the I/O queue request. For example, site to queue mapper 442 may include which queues are the result of which request by host 110/application 114. In some embodiments, site to queue mapper can map I/O queues to more than one storage site simultaneously. The processing of each the I/O queue at each site may be tracked.

Queue identifier 443 can be any combination of hardware and/or software configured to identify I/O queues established across multiple sites in a multi-site storage system. In some embodiments, queue identifier 443 can identify redundant queues. A redundant I/O queue may be one or more queues that are created by a request from host 410 and/or application 414 on multiple storage systems in a multi-site storage system.

Notifier engine 444 can be any combination of hardware and/or software configured to communicate data with host 410. In some embodiments, notifier engine 444 sends a signal in response redundant queues being identified. The signal may instruct host 410 to terminate the connection, thereby freeing up resources used to maintain the redundant queues. In some embodiments, the signal may include an instruction for the host to track and record completion of the I/O queues in the related request. Thus, in the event of a site failure, the connection may be re-established, and the backup storage system may provide I/O support for host 410.

In some embodiments, the notifications are sent as an asynchronous event request (AER). An AER is a request that is returned after a condition is met. For example, an AER may be sent/returned to notify the host of redundant queues.

Out of band API 445 can be any combination of hardware and/or software configured to notify host outside of the NQN connection, of redundant I/O queue creation. The out-of-band API 445 allows for a separate communication method. This may provide notification in the event of issues (e.g., bandwidths, bottleneck, etc.) within the NQN. This may be sent to storage manager 412, application 414 and/or host 410.

Figure 6:
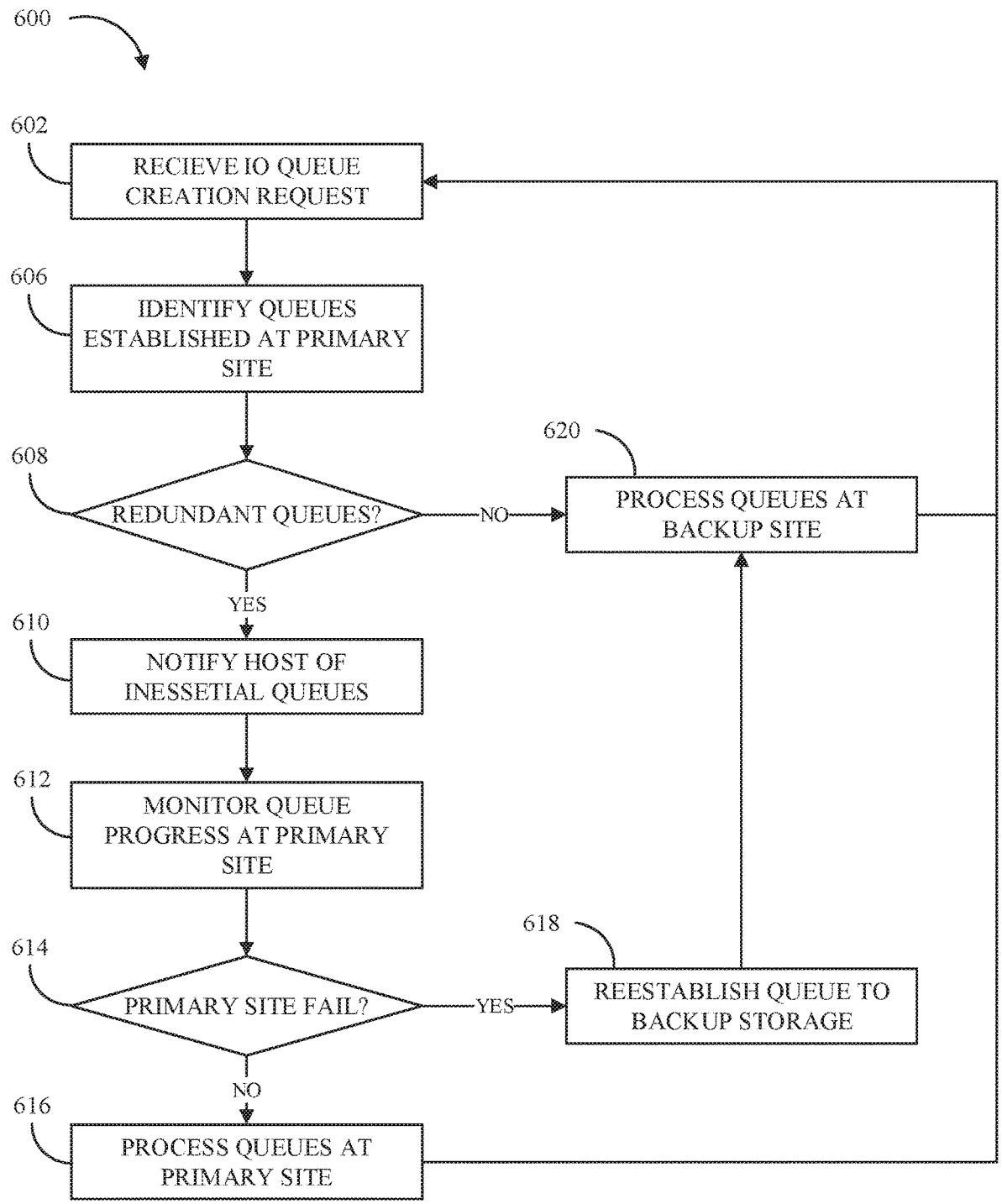
FIG. 6 illustrates a flow chart of an example method to identify redundant I/O queues in a multi-site storage system, in accordance with some embodiments of the present disclosure.

FIG. 6 depicts a flowchart of an example method, method 600, for managing I/O queues in a multi-site storage system, that can be performed in a computing environment (e.g., computing environment 400 and/or host 410). One or more of the advantages and improvements described above for identifying and correcting duplicate queues may be realized by method 600, consistent with various embodiments of the present disclosure.

Method 600 can be implemented by one or more processors, host 410, storage manager 412, primary storage 420, backup storage 430, clustering layer 440, their subcomponents, and/or a different combination of hardware and/or software. In various embodiments, the various operations of method 600 are performed by one or more of host 410, storage manager 412, primary storage 420, backup storage 430, clustering layer 440, and the subcomponents of each of the foregoing. For illustrative purposes, the method 600 will be described as being performed by queue manager 441.

At operation 602, queue manager 441 receives an I/O queue creation request. In some embodiments, the request is generated by host 410. Host 410 may send the request to primary storage 420 and/or backup storage 430. In some embodiments, the request is generated by application 414. In some embodiments, receiving the request includes assigning the queues to one or more of backup cores 432. In some embodiments, the request is sent to a disaster recovery system.

In some embodiments, operation 602 includes obtaining/checking for the volume details mapped to host 410. This may be obtained from a volume mapping table. The volume mapping table shows what volumes of memory are currently being accessed/used by one or more systems. It may include details about which and/or how many I/O queues have been established.

At operation 604, queue manager 441 identifies I/O queues established on a separate storage system. For example, if the request was received by backup storage 430, then queue manager 441 may check primary storage 420 for established I/O queues. In some embodiments, operation 604 includes fetching NQN data for the connections. This may be stored as metadata on primary storage 420.

In some embodiments, the previously established queues are obtained by clustering layer 440, and/or backup controller 431. These can be obtained from host 410, and/or storage manager 412.

At operation 608, queue manager 441 determines if the request includes redundant queues. In some embodiments, a queue is redundant/unnecessary/inessential if the queues that would be established in response to the request are the same as the queues established between host 410 and primary storage 420. In some embodiments, determining the queues are inessential is based on comparing volume mapping data with host 410 against the NQN's (or established I/O queues) on primary storage 420.

In some embodiments, operation 608 includes checking for additional data with the request. The additional data may include a signal to process the I/O queues even if the queues are redundant. The additional data may be a flag or other similar data. This may be an override flag. If the additional flag is present, then queue manager 441 may proceed as through there are no inessential queues. For example, an override flag may cause queue manager 441 to skip operation 606 and/or define the outcome of operation 608.

If it is determined there are inessential queues (608:YES) then queue manager 441 proceeds to operation 610. If it is determined there are no inessential queues (608:NO) then queue manager 441 proceeds to operation 620.

At operation 610, queue manager 441 notifies the host of the inessential queues from the request. In some embodiments, the notification is sent from the target (e.g., backup storage 430), to host 410. The signal may be sent via the same method the request was received, such as through the NQN connection. In some embodiments, the notification of inessential queues is sent out of band. The out of band may be an API and/or other similar communication protocol. In some embodiments, the notification is sent as an AER.

In some embodiments, operation 610 includes notifying backup controller 431 of the essential queues. This may allow the backup controller 431 to release/deallocate any resources related to the request.

At operation 612, queue manager 441 monitors the progress of I/O queue completion at primary storage 420. In some embodiments, monitoring includes tracking and recording the completion of each queue, request, extent, and/or volume. In some embodiments, the one or more of host 410, host controller 416, and application 414 monitor I/O queue processing. In some embodiments, one or more of clustering layer 440 backup storage 430, and backup controller 431 monitor I/O queue processing. In some embodiments, the monitoring is commenced in response to the inessential queue notification being generated and/or sent.

While it will use some computing resources to monitor queue processing, it will be less than is needed to maintain the redundant queues on both host 410 and backup storage 430. The now freed resources can be utilized by different applications and/or processes.

At operation 614, queue manager 441 determines if primary storage 420 failed (e.g., is no longer operating). The failure may be in response to a natural or human caused event. In some embodiments, failure is when the system can no longer send/receive/process data. In some embodiments, primary storage 420 failed when NQN and/or other connections are terminated before the queues are completed. In some embodiments, host 410 determines primary storage 420 failed. In some embodiments, clustering layer 440 determines primary storage 420 failed. For example, if backup controller 431 loses communication with primary controller 421, that may indicate a loss of power, and thereby a failure.

If it is determined primary storage 420 failed (614:YES) then queue manager 441 proceeds to operation 618. If it is determined primary storage 420 has not failed (614:NO) then queue manager 441 proceeds to operation 616.

At operation 616, queue manager 441 completes processing of all I/O queues at primary storage 420 per received request. In some embodiments, queue manager 441 returns to operation 602 in response to processing/completing all I/O queues.

At operation 618, queue manager 441 reestablishes I/O queues to backup storage 430. In some embodiments, this includes a new request for an NQN connection between host 410 and backup storage 430. In some embodiments, the I/O queues established on the reestablished connection are based on the monitoring of operation 612.

At operation 620, queue manager 441 processes the queues at backup storage 430 per received request. In some embodiments, queue manager 441 returns to operation 602 in response to processing/completing all I/O queues.

COMPUTER TECHNOLOGY AND COMPUTER READABLE MEDIA

The one or more embodiments disclosed herein accordingly provide an improvement to computer technology. For example, an improvement to a search engine allows for a more efficient and effective search for information by the user. The ability to access stored information with which the user has interacted with in some manner, and allowing the weighting of the importance of this information to decay over time beneficially improves the operation of the search and benefits the user in that more pertinent results may be presented to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving, from a host, by a backup storage system, a request to process a first set of Input/Output (I/O) queues on the backup storage system, wherein the backup storage system is a second subsystem in a multi-site storage system;
allocating memory on the backup storage system for processing the first set of I/O queues;
identifying a second set of I/O queues established at a primary storage system, wherein the primary storage system is a first subsystem in the multi-site storage system and the backup storage system includes a backup copy of data stored on the primary storage system;
determining the first set of I/O queues are redundant, wherein the first set of I/O queues are redundant when the first set of I/O queues and the second set of I/O queues process an equivalent set of commands, as included in the request;
responsive to determining that the first set of I/O queues are redundant:
notifying via the host, that the first set of I/O queues are redundant;
terminating a connection between the host and the backup storage system; and
de-allocating the memory to process the first set of I/O queues.

2. The method of claim 1 further comprising:
monitoring processing of the second set of I/O queues;
determining a failure of the primary storage system;
notifying the host of the failure of the primary storage system;
in response to determining the failure of the primary storage system, re-establishing the connection between the host and the backup storage system and re-allocating the memory to the second set of I/O queues on the backup storage system; and
processing the second set of I/O queues on the backup storage system.

3. The method of claim 1, wherein the host, the primary storage system, and the backup storage system use a non-volatile memory express (NVMe) protocol.

4. The method of claim 3, wherein the notifying occurs via an asynchronous event request through an NVMe qualified name (NQN) connection.

5. The method of claim 1, further comprising:
receiving, from the host, a second request to process the first set of I/O queues;
determining the request includes an override flag;
processing, in response to the determining that the request includes the override flag, the first set of I/O queues on the backup storage system.

6. The method of claim 1, wherein the notifying occurs via an out-of-band communications.

7. The method of claim 6, wherein the out of band communication includes an application programming interface call.

8. The method of claim 1, wherein the primary storage system and the backup storage system are included in a disaster recovery system.

9. The method of claim 8, wherein the disaster recovery system syncs data between the primary storage system and the backup storage system.

10. A system comprising:
a processor; and
a computer-readable storage medium communicatively coupled to the processor and storing program instructions which, when executed by the processor, are configured to cause the processor to:
receive, from a host, by a backup storage system, a request to process a first set of Input/Output (I/O) queues on the backup storage system, wherein the backup storage system is a second subsystem in a multi-site storage system;
allocate memory on the backup storage system for processing the first set of I/O queues;
identify a second set of I/O queues established at a primary storage system, wherein the primary storage system is a first subsystem in the multi-site storage system and the backup storage system includes a backup copy of data stored on the primary storage system;
determine the first set of I/O queues are redundant, wherein the first set of I/O queues are redundant when the first set of I/O queues and the second set of I/O queues process an equivalent set of commands, as included in the request;

responsive to determining that the first set of I/O queues are redundant:
  notify via the host, that the first set of I/O queues are redundant;
  terminate a connection between the host and the backup storage system; and
  de-allocate the memory to process the first set of I/O queues.

11. The system of claim 10, wherein the program instructions are further configured to cause the processor to:
  monitor processing of the second set of I/O queues;
  determine, a failure of the primary storage system;
  notify the host of the failure of the primary storage system;
  re-establish, in response to determining the failure of the primary storage system, the connection between the host and the backup storage system and re-allocate the memory to the second set of I/O queues on the backup storage system; and
  process the second set of I/O queues on the backup storage system.

12. The system of claim 10, wherein the host, the primary storage system, and the backup storage system use a non-volatile memory express (NVMe) protocol.

13. The system of claim 10, wherein the program instructions are further configured to cause the processor to:
  receive, from the host, a second request to process the first set of I/O queues;
  determine, the request includes an override flag;
  process, in response to determining the request includes the override flag, the first set of I/O queues on the backup storage system.

14. A computer program product, the computer program product comprising a computer readable storage medium having program instructions embodied therewith, the program instructions executable by a processing unit to cause the processing unit to:
  receive, from a host, by a backup storage system, a request to process a first set of Input/Output (I/O) queues on the backup storage system, wherein the backup storage system is a second subsystem in a multi-site storage system;
  allocate memory on the backup storage system for processing the first set of I/O queues;
  identify a second set of I/O queues established at a primary storage system, wherein the primary storage system is a first subsystem in the multi-site storage system and the backup storage system includes a backup copy of data stored on the primary storage system;
  determine the first set of I/O queues are redundant, wherein the first set of I/O queues are redundant when the first set of I/O queues and the second set of I/O queues process an equivalent set of commands, as included in the request;
  responsive to determining that the first set of I/O queues are redundant:
    notify via the host, that the first set of I/O queues are redundant;
    terminate a connection between the host and the backup storage system; and
    de-allocate the memory to process the first set of I/O queues.

15. The computer program product of claim 14, wherein the program instructions are further configured to cause the processing unit to:
  monitor processing of the second set of I/O queues;
  determine, a failure of the primary storage system;
  notify the host of the failure of the primary storage system;
  re-establish, in response to determining the failure of the primary storage system, the connection between the host and the backup storage system and re-allocate the memory to the second set of I/O queues on the backup storage system; and
  process the second set of I/O queues on the backup storage system.

16. The computer program product of claim 14, wherein the host, the primary storage system, and the backup storage system use a non-volatile memory express (NVMe) protocol.

17. The computer program product of claim 14, wherein the program instructions are further configured to cause the processing unit to:
  receive, from the host, a second request to process the first set of I/O queues;
  determine, the request includes an override flag;
  process, in response to determining the request includes the override flag, the first set of I/O queues on the backup storage system.

* * * * *